June 9, 1936.  H. E. SJÖSTRAND  2,043,336

DEVICE FOR LOCATING THE POSITION OF A MOVABLE BODY

Filed Dec. 10, 1932  3 Sheets-Sheet 1

INVENTOR:
HJALMAR E. SJOSTRAND,
by
His Attorneys.

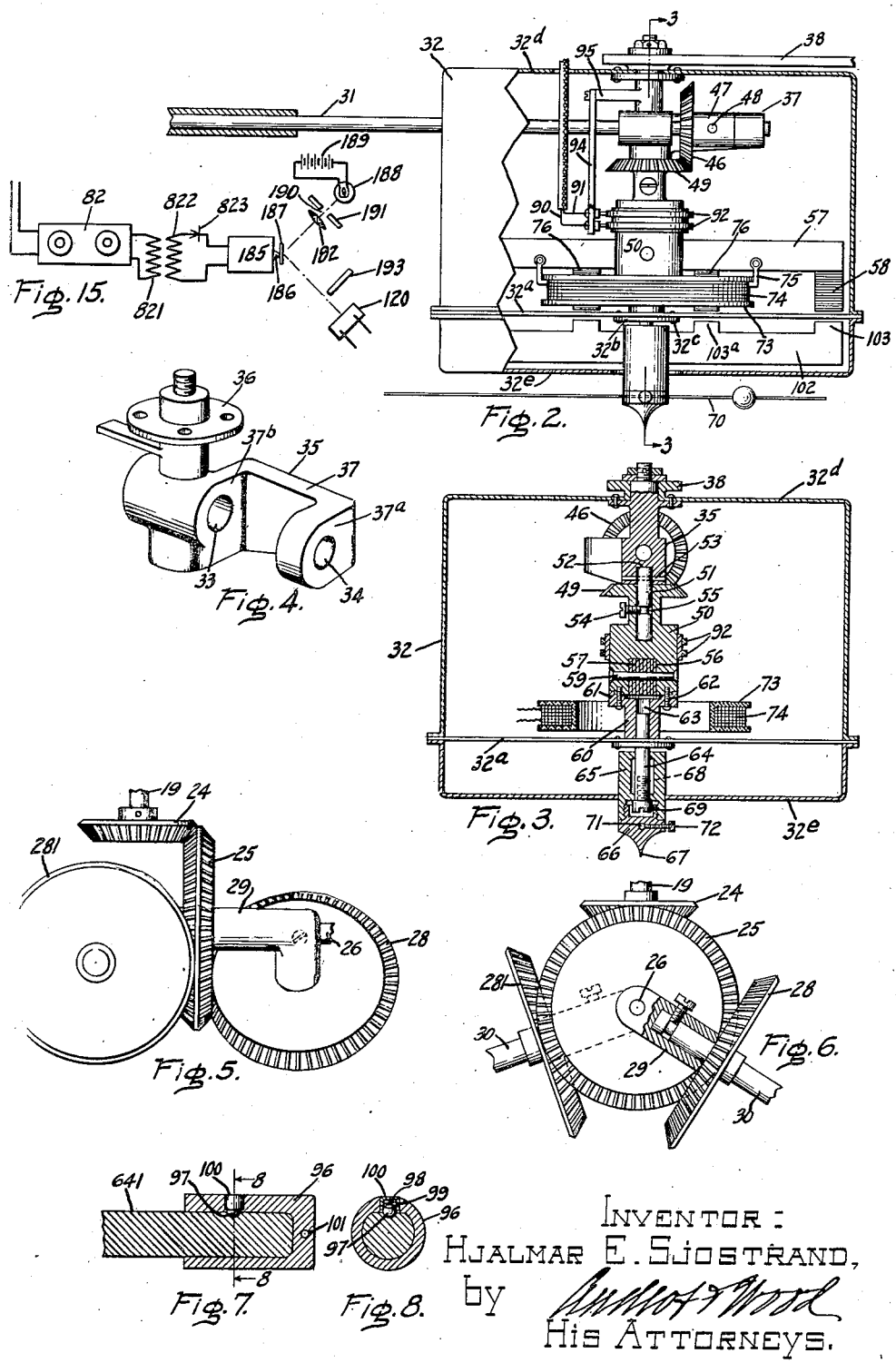

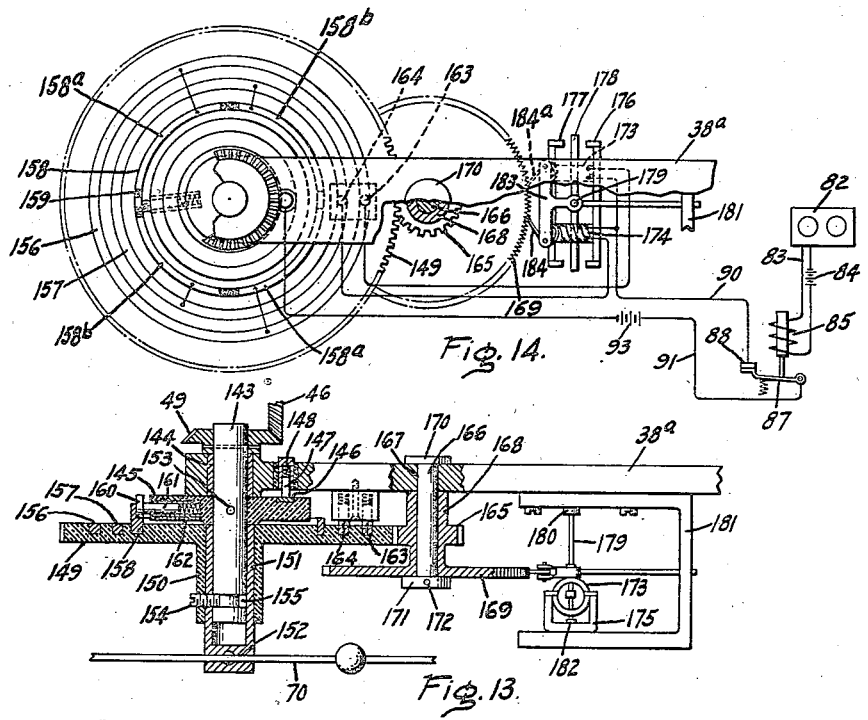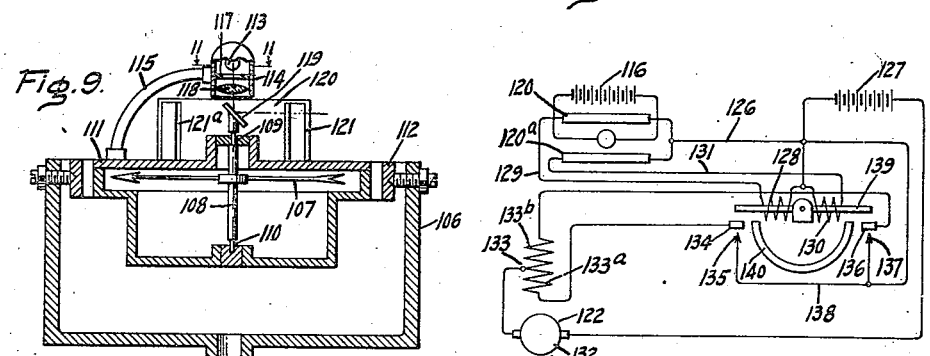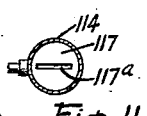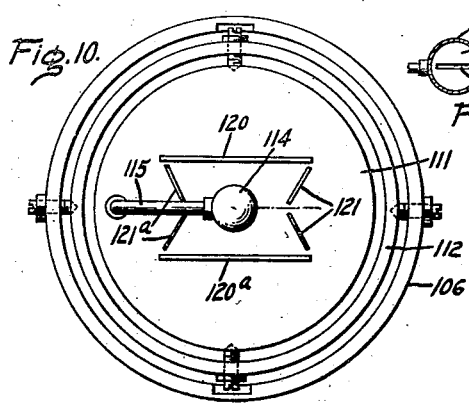

Patented June 9, 1936

2,043,336

UNITED STATES PATENT OFFICE 2,043,336

DEVICE FOR LOCATING THE POSITION OF A MOVABLE BODY

Hjalmar E. Sjöstrand, Ravala, Grangesberg, Sweden

Application December 10, 1932, Serial No. 646,729

12 Claims. (Cl. 250—11)

My invention more particularly relates to a device which utilizes electromagnetic waves transmitted from spaced stations of known positions for geographically locating the position of a movable body with respect to the surface of the earth. My invention is particularly applicable for use in locating the position of a vessel or airplane with reference to the surface of the earth, although it will be understood that it is equally applicable for indicating the position of any movable body.

In my pending application Ser. No. 646,728 I have shown and described a device for indicating the position of a movable body in which a chart on which the indication is made is continuously maintained in an oriented position.

One of the objects of my invention is the provision of means for indicating on a chart which is mounted on a movable body and which is fixed with respect thereto, the position of the movable body.

In the embodiment of my invention illustrated, electromagnetic waves of different characteristics are transmitted from spaced stations of known positions, and means are provided for utilizing the waves and indicating on the chart the position of the movable body.

In accordance with my invention the means for indicating the position of a movable body on the chart preferably comprises a rotatable or oscillatable antenna wire loop with associated means for producing visible lines passing through points on the chart which correspond to the positions of the transmitting stations coinciding in direction with the direction lines from the movable body to the transmitting stations.

Other objects of my invention will appear in the specification and will be more particularly pointed out in the claims.

My invention will best be understood by reference to the accompanying drawings in which I have illustrated a preferred embodiment thereof and in which—

Fig. 2 is a plan view partially broken away illustrating one of the devices that is positioned over the point on the chart corresponding to the position of a given transmitting station;

Fig. 3 is a section taken along the line 3—3 of Fig. 2;

Fig. 4 is a perspective view illustrating a supporting bracket for certain of the parts illustrated in Figs. 2 and 3;

Fig. 5 is a fragmentary plan view of certain of the parts;

Fig. 6 is a side view of Fig. 5;

Fig. 7 is an enlarged sectional view through the portion of the indicating device carrying one of the pointer arms;

Fig. 8 is a sectional view taken along the line 8—8 of Fig. 7;

Fig. 9 is a sectional view through a portion of the device which orients a rotatable member;

Fig. 10 is a plan view of Fig. 9;

Fig. 11 is a sectional plan view taken along the line 11—11 of Fig. 9;

Fig. 12 is a diagram of connections for the device which orients said rotatable member;

Fig. 13 is a sectional view of a modification which may be substituted for the device illustrated in Figs. 2 and 3;

Fig. 14 is a plan view of Fig. 13;

Fig. 15 illustrates diagrammatically a modified form of relay, and

Like reference characters indicate like parts through out the drawings.

Figure 1:
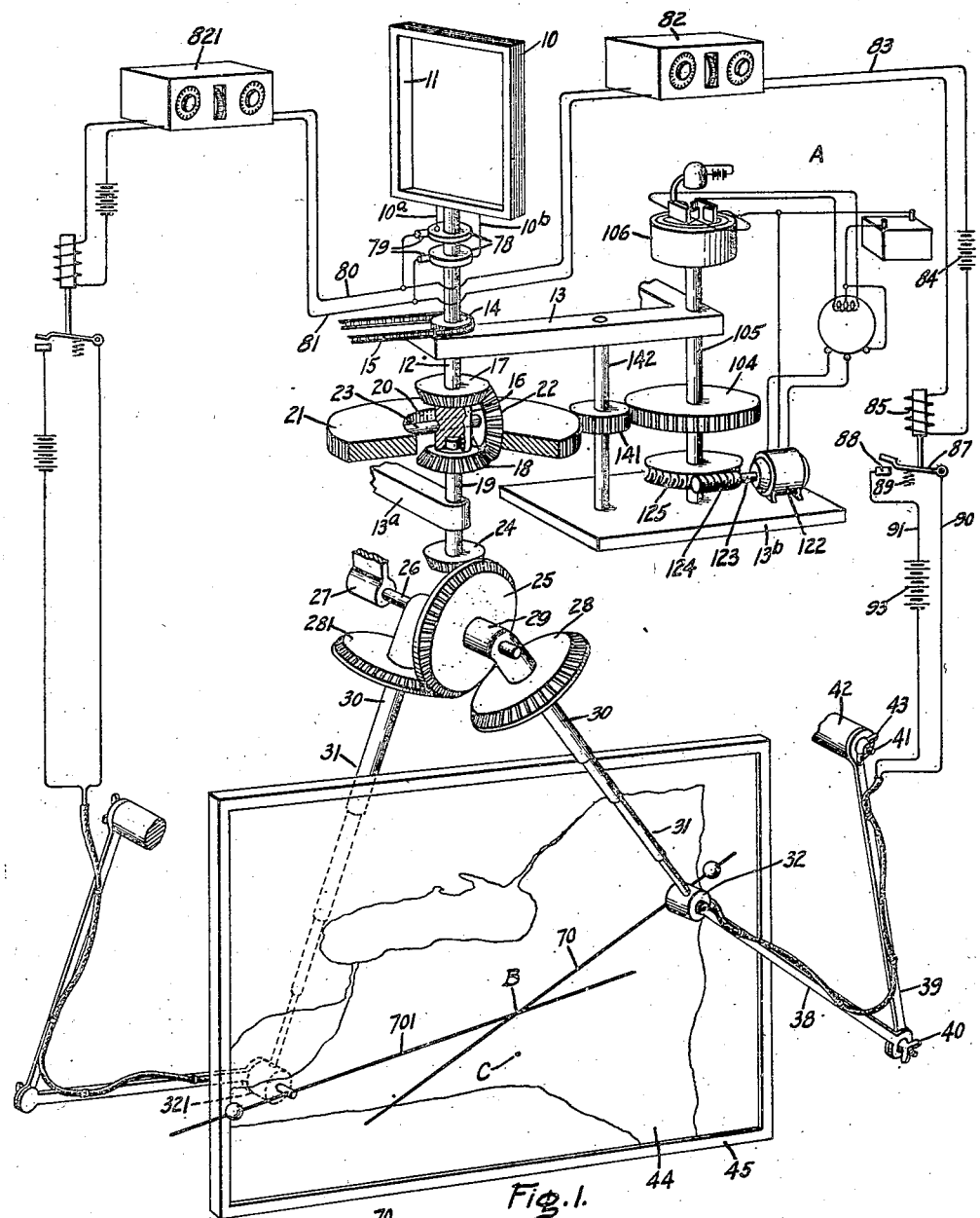
Fig. 1 is a diagrammatic perspective view of a device embodying my invention.

Referring now to the drawings and first to Fig. 1, 10 is an antenna loop in which currents or signals are induced by electromagnetic waves transmitted from distant stations. The loop 10 is mounted on a suitable frame 11 which is in turn mounted on a shaft 12 having its bearings in standards 13 and 13a which are fixed on the vessel or other movable body. The shaft 12 is preferably continuously rotated during the operation of the device, in the embodiment illustrated, by a sprocket 14 secured on the shaft 12 and which is rotated by a sprocket chain 15 which may be connected to any suitable source of power.

The lower end of the shaft 12 is received in an opening in the upper end of a hub 16 and a bevel gear 17 is secured on the shaft adjacent the hub. A second bevel gear 18, preferably having the same number of teeth as the bevel gear 17, is mounted on a shaft 19 the upper end of which is received in an opening in the lower end of the hub 16. The hub 16 passes through an opening 20 in a gear wheel 21, the purpose of which will be more fully hereinafter described. A planetary gear 22 engages the bevel gears 17 and 18 and is mounted on a shaft 23 which is, in turn, mounted in the gear wheel 21.

To the lower end of the shaft 19 is secured a bevel gear 24 engaging the gear teeth on one side of a double bevel gear 25 mounted on a shaft 26 having its bearings in parts which are fixed to the movable body and one of which is indicated at 27. The double bevel gear 25 is preferably of the same size and has on each side the same number of teeth as the bevel gear 24.

The teeth on the one side of the double bevel gear 25 are engaged by a bevel gear 28, preferably having the same number of teeth as does the bevel gear 24 and mounted on an arm 29 pivoted on the shaft 26. Sleeves 30 are secured to the bevel gears 28 and 281 and form part of telescoping shafts indicated generally at 31, the opposite ends of which pass through openings in casings 32 and 321, respectively, forming a part of the position indicating means. The end of one shaft 31 passes through openings 33 and 34 in a bracket 35 having an offset portion 37, as best shown in Fig. 4, the bracket being provided with a flange 36 which may be secured to one side of the casing, as best shown in Figs. 2 and 3.

The casing 32 is preferably mounted on an arm 38 (Fig. 1) the end of which is pivoted to an arm 39 and capable of being clamped thereto by a wing nut 40. The end of the arm 39 is pivotally mounted on a stud 41 on a fixed support 42 to which it may be clamped by a wing nut 43. The arms 38 and 39 permit the positioning of the casing 32 over any desired point on a chart 44 mounted on a frame or panel 45 which is fixed to the vessel or other movable body. In the embodiment illustrated, the frame 45 is mounted in a vertical position, although it will be understood that the same may be mounted in a horizontal or other desired position.

Mounted on the end of the shaft 31 between the portions 37a and 37b of the offset portion 37 of the bracket is a bevel gear 46 secured to and preferably integral with a hub 47 which may be secured to the shaft 31 as by a pin 48. The bevel gear 46 meshes with a bevel gear 49, preferably having the same number of teeth as the bevel gear 46 and preferably integral with a cylindrical member 50 mounted on a shaft 51, the upper end of which is received in a socket 52 in the bracket member 35 and is secured thereto as by a pin 53. The member 50 is preferably supported on the shaft 51 by a screw 54, the end of which is received in a cylindrical groove 55 formed on the shaft 51.

The lower end of the cylindrical member 50 is provided with a recess 56 in which is received a laminated armature 57 provided at its ends with pole pieces 58, one of which is indicated in Fig. 2. The armature is preferably secured in position by a pin 59 fastened to the cylindrical member 50 and the armature 57. A hub 60 is provided with a flange 61 which is secured to the lower end of the cylindrical member 50 as by screws 62. The hub 60 is provided with an opening 63 in which is received a shaft 64 which is secured to a transverse shield 32a by a flange 32b as by rivets 32c. The shield is preferably secured in position between upper and lower sections 32d and 32e, respectively, of the casing. The shield prevents the rotatable parts in the lower portion of the casing from being affected by air currents or other disturbing influences set up by the rotation of the parts in the upper portion of the casing. On the shaft 64 is mounted a sleeve 65 the lower end of which is interiorly threaded, as indicated in Fig. 3, and in which is received a tip 66 tapering to a point 67.

The lower end of the shaft 64 is provided with a tapped opening 68 in which is received a screw 69 the head of which secures said sleeve 65 to the shaft. The point 69 may be positioned over a point on the chart 44 indicating the position of a transmitting station. The pointer arm 70 is received in an opening 71 in the tip 68 and may be secured in position by a screw 72. A spool 73 is provided with a coil 74 and is secured by clamps 75 to the armature 57. The armature 57 is also provided with pole pieces 76, which extend downwardly within the coil 74.

The terminals of the loop 10 are connected as by leads 10a and 10b to collector rings 78 which are connected by brushes 79 to conductors 80 and 81, respectively, which are in turn connected to receivers 82 and 821 which receive currents of different characteristics from different transmitting stations.

Preferably waves of different lengths are transmitted from the different stations and the receivers 82 and 821 are tuned to the wave lengths from the respective stations which are received on the input side of the receivers and amplified. The amplified signal is partly rectified by the detector tube and resultant current impulses from the receiver 82 pass through the circuit 83 including the battery 84 and the relay 85. It will be understood that the resultant current impulses vary in proportion to the incoming signal so that as that signal increases, the current in the relay circuit is correspondingly increased and vice versa. It is to be understood, however, that waves of the same length may be transmitted from different stations with different modulated frequencies and the different modulated frequencies separated in the audio side of the receiver.

The armature of the relay 85 is connected to a movable contact member 87 which engages a fixed contact 88, the contacts being normally held open by the relay magnet against the action of a spring 89. The contacts 87 and 88 are included in a circuit including conductors 90 and 91 and a battery 93 which conductors are connected to slip rings 92 mounted on but insulated from the cylindrical member 50 in the casing 32. The conductors 90 and 91 within the casing 32 are supported by an arm 94 mounted on a bracket 95 secured on the bracket member 35. Conductors (not illustrated) lead from the slip rings 92 to the coil 74.

The casing 32 is located in front of the chart 44 over which the pointer arm 70 is moved. A similar pointer arm 701 is also moved over the chart 44 and intersects the arm 70. The arm 701 is mounted on a casing 321, which is generally similar to the casing 32 already described except for the fact that instead of having a tip 68 and the associated parts described in connection with the casing 32, a cap 96 is received over the end of the shaft 641 as best shown in Figs. 7 and 8. The end of the shaft 641 projects through an opening in the chart 44. After the end of the shaft is inserted through the opening in the chart, the cap 96 is secured in position on the end of the shaft by means of a ball 97 which is pressed inwardly into a recess formed in the upper flattened side of the shaft 64 by a spring 98 received in a recess 99 in a casing 100 which is in turn received in an opening in the cap 96. The arm 701 is received in an opening 101 in the cap 96. The casings 32 and 321 are preferably mounted on opposite sides of the map and frame therefor in order that they may not interfere with each other in suitably positioning the same with respect to the chart.

A floating, oscillatable member 102 (Fig. 2) of silicon steel or the like which is quickly magnetized and quickly loses its magnetism is secured on the sleeve 65 and is provided with pole pieces 103 and 103a which cooperate with the poles 58 and 76, respectively, of the armature 57. Two positions are selected on the chart 44 corresponding to the positions occupied by the two transmitting stations located on the surface of the earth. At the one station on the chart a perforation is made through the chart and through the frame on which it is mounted, and the end of the shaft 641 projects therethrough, the pointer arm 701 being received in the opening 101 in the cap 96 on the end of the shaft 641. The other casing 32 is then manipulated until the point on the tip 66 is located exactly over the point indicating the other station. The electromagnetic waves are transmitted from their stations and induce current in the antenna loop 10 and are, of course, of variable intensity during the rotation of the loop 10. When the plane of the loop is at right angles to the electromagnetic waves transmitted from a given station, a current of maximum intensity is induced in the loop and when the coil is in the line of the magnetic waves no current is induced therein. In the embodiment of my invention illustrated, the device operates on the minimum current or no current within the loop. In other words, the relay 85, which it will be understood should be quick and sensitive, normally maintains the circuit comprising the conductors 90 and 91 open and when the antenna loop arrives at the position where no current or the minimum current is induced in the loop 10, the relay 85 is de-energized and the circuit controlled thereby is closed and the magnetic coil 74 is energized. The cap 96 on the shaft 641 and the tip 66 thus constitute oscillatable devices located over points on the chart corresponding in position to the positions of the transmitting stations on the surface of the earth and are actuated by the oscillatable members 102.

The rotation of the shaft 12 and the bevel gear 17 produces rotation of the shaft 19 at the same speed and in the opposite direction through the planetary gear 22. The bevel gear 24 rotates the bevel gear 25 and the bevel gear 28 meshing therewith in the same direction as the bevel gear 24, and at the same speed since the two gears have the same number of teeth. That is to say, looking down upon the gears 24, 25 and 28 and assuming that the bevel gear 24 rotates clockwise, then the bevel gear 28 also rotates clockwise in the same direction and at the same speed. The shaft 31 rotates the bevel gear 46 which in turn rotates the bevel gear 49 at the same speed and this in turn rotates the cylindrical member 50 and the armature 57 mounted thereon at the same speed and in the same direction as the shaft 12 and the loop 10 mounted thereon.

For each rotation of the loop 10 there are two points for each station when no current or a minimum current is induced therein, and the circuit including the battery 93 which is controlled thereby is closed twice and the magnetic coil 74 is twice energized. This minimum current in the loop 10 occurs at variable points in the angular position thereof depending upon the position of the movable body relative to the transmitting station and always at the instant that the plane of the loop is at right angles to the line from the movable body to the given transmitting station. When the coil 74 is energized, the laminated armature 57 is magnetized and the poles 103 and 103a of the part 102 are attracted by the poles 58 and 76 respectively of the armature 57. The part 102, therefore, is maintained immediately in front of the armature 57, and turns the sleeve 65 on which it is mounted and correspondingly the arm 70 which is mounted thereon so that the direction of the arm 70 which passes through the point on the map which indicates the position of one of the transmitting stations, corresponds in direction to the direction of the movable body from the transmitting station. Similarly the arm 701 which passes through the point on the map which indicates the position of another transmitting station, is maintained in the same direction with reference to the chart that the movable body occupies with reference to the other transmitting station, and the point of intersection of the arms 70 and 701 indicates the position of the movable body on the chart 44.

It will be noted that the double bevel gear 25 rotates the bevel gear 281 which engages the opposite side thereof from the bevel gear 28 in the direction opposite to the rotation of bevel gear 28 which is correct, since the casing containing the bearing 321 is turned (being on the opposite side of the map) in the direction opposite to the casing 32.

Referring to Fig. 1, assume that B on the map which is the point of intersection of the arms 70 and 701 indicates the position of the movable body. Also assume that the movable body is to move to a position represented by the point C on the map which is directly south of the position B. The map indicates that the transmitting station at 32 is easterly of both of the points B and C and that the station at 321 is westerly thereof. The direction line from the point C on the map to the station 32 indicates that a counterclockwise change of the active position of the loop 10 relative to the transmitting station represented by 32 must be made. Such counterclockwise movement of the active position of the loop 10 produces a counterclockwise movement of the bevel gear 17, clockwise movement of the bevel gears 18 and 24, counterclockwise movement of the bevel gear 25, clockwise movement of bevel gears 28 and 46 and a counterclockwise movement of bevel gear 49 and the arm 70. Likewise, the direction from the point C on the chart to the station 321 indicates that a clockwise direction of the active position of the loop must now be made. Assuming that the loop is turned clockwise, then the bevel gear 17 is turned clockwise, the bevel gears 18 and 26 counterclockwise and the gear 25, 281 and 46 clockwise and bevel gear 49 counterclockwise which produces a clockwise movement of the arm 701 as viewed from the front of the map.

In order more easily to describe and understand the operation of the device, let us assume that the loop is not rotating and that it is moved manually until the direction of the station is found. Then the relay 85 closes the circuit which energizes the coil 74 and thereby holds the arm 70 in a certain position relatively to said loop. In case the vessel turns 90° clockwise, we have to turn the loop counterclockwise through the same angular amount to find the 70 station. This counterclockwise motion of the loop relative to the ship would also cause the arm 70 to turn 90° counterclockwise, and thus render the indication given by the pointer inaccurate. The same inaccuracy would of course be present when the antenna loop and associated parts are rotated.

My invention comprises a device indicated generally at A for compensating for turning movements of the movable body and overcoming the inaccuracy that would otherwise be produced.

In the embodiment of my invention illustrated a rotatable member in the form of a gear 104 is mounted on a shaft 105 having its bearings in frames 13 and 13b which are fixed on and move with the vessel, and this gear is oriented in a predetermined direction by a device indicated generally at A which will now be described. On the upper end of the shaft 105 is mounted a dished member 106 (see Fig. 9). A magnetic needle 107 is mounted on a spindle 108 which has its bearings at 109 and 110 in the bottom and top plates, respectively, of a casing 111 which is mounted for universal movement within the dished member 106, the casing being pivotally mounted in a gimbal ring 112 which is in turn rotatably mounted within the dished member 106 as in the usual gimbal. The magnetic needle is thus kept in a horizontal position irrespective of the movements of the vessel or other movable body on which the parts shown in Fig. 9 are mounted.

A source of light, which is shown in the form of an incandescent lamp 113 is mounted in an open bottomed casing 114, the casing being mounted on a standard 115 which is in turn mounted on the casing 111. The lamp is included in a circuit (see Fig. 12) in which is included a battery 116 or other source of electric energy. A transverse opaque partition 117 is mounted in the casing 114 and is provided with a narrow slit 117a, as best shown in Fig. 11, through which passes a beam or line of light which then passes through a projecting lens 118.

A mirror 119 is mounted on the upper end of the spindle 108 and preferably at an angle of 45° thereto. Selenium cells or other photo electric cells 120 and 120a are mounted on the casing 111 and preferably in parallel relation, as best shown in Figs. 10 and 12. At the respective ends of the cells are mounted two pairs of mirrors 121 and 121a which are arranged at an angle to the photo electric cells. The ends of the two pairs of mirrors 121 and 121a are slightly spaced. The lens 118 is so located relatively to the slit 117a in the partition 117 as normally to project the image of the slit through the space between the mirrors 121.

The means for maintaining the gear 104 oriented in a predetermined direction also comprises a motor indicated generally at 122 which, it will be understood, is mounted on a stationary portion of the vessel or other movable body. The shaft 123 of the motor is provided with a worm 124 engaging a wormwheel 125 mounted on the lower end of the shaft 105.

Referring particularly to Fig. 12 the selenium cells 120 and 120a are connected by a conductor 126 to one pole of a battery 127. The other pole of the battery is connected to a point from which the circuit branches, one portion of the circuit includes a coil 128 and conductor 129 which is connected to the selenium cell 120 while the other branch includes a coil 130 and a conductor 131 which is connected to the other selenium cell 120a.

The battery 127 is also connected to the armature 132 of the motor. The motor comprises a field indicated generally at 133 which includes two windings 133a and 133b. The terminal of the winding 133a is connected to a movable contact 134 which cooperates with a fixed contact 135 while the terminal of the field coil 133b is connected to a movable contact 136 cooperating with a fixed contact 137, both of the fixed contacts 135 and 137 being connected by a conductor 138 to the battery 127. I have illustrated the coils 128 and 130 surrounding a bar of iron in a direction to produce a north pole at the associated end of the bar when either of said coils is energized. A permanent magnet 140 is preferably associated with the bar 139 so that the associated end of the bar is depressed when the coil 128 or 130 is energized, and the contact 134 or the contact 136 brought into engagement with the contact 135 or the contact 137, the two coils 128 and 130 being wound on the bar 139 in such a direction as to reverse the poles at the ends of the bar 139 when the respective coils are energized. The gear wheel 104 engages an intermediate gear 141 mounted on a shaft 142, the gear 141 in turn engaging the gear wheel 21.

The operation of the device for maintaining the gear 104 oriented in a predetermined direction and for compensating for the turning of the vessel is as follows:—

Normally, as above described, the line or beam of light from the light source 113 passes through the opening between the mirrors 121. Assuming that the movable body turns, then the gear wheel 104 will also turn the dished member 106 and the casing 111 will also be turned while the magnetic needle 107 and the mirror 119 which is mounted on the spindle thereof will remain stationary. The beam of light 45 then instead of passing through the opening between the mirrors 121 will be directed against one or the other of the photo electric cells, depending upon the direction of turning of the vessel. Assuming that the vessel so turns that the light is directed against the selenium cell 120, then the resistance of the cell is greatly decreased and the coil 128 which is included in the circuit of that cell and which is normally de-energized is now energized and the associated end of the bar 139 is attracted by the magnet 140 and the left hand end of the bar, as viewed in Fig. 10 brings the movable contact 134 into engagement with the stationary contact 135 thereby closing a circuit from the battery 127 through the armature of the motor, the field coil 133a and the contacts 134 and 135 to the other pole of the battery 137. The armature of the motor is thereby rotated in a direction to cause the dished member to turn in a direction to bring the mirrors 121 and 121a back to the position where the light beam from the mirror 119 passes through the opening between the mirrors 121. The shaft 105 is thereby rotated by the motor sufficiently to bring the gear 104 to its normal oriented position. Conversely, should the vessel turn in the opposite direction, then the light from the lamp 113 would be directed against the photo electric cells 120a, the contacts 136 and 137 would be closed and the circuit closed through the armature of the motor and through the field 133b, and as the current is thereby reversed in the field, the armature of the motor would then rotate in the opposite direction thereby returning the photo electric cells and the gear 104 to their normal positions.

As the gear 104 is maintained in a predetermined oriented position, the intermediate gear 141 is rotated, during the turning movement of the vessel, and the gear wheel 21 is correspondingly rotated. The gear ratio of the gear 21 to that of the gear 104 is two to one so that should the vessel turn through an angle of 90°, the gear wheel 21 would turn through an angle of 45°. Such movement of the gear wheel 21 produces a planetary movement of the gear 22, and, assuming that the bevel gear 18 of the differential mechanism is kept stationary, then the bevel gear 17 is turned through an angle which is double the angle through which the gear wheel 21 has turned, in other words, 90° under the conditions assumed, and, in any case, through the same angle that the vessel has turned. This movement of the gears comprising the differential gear turns the loop 10 relatively to the indicating mechanism and thereby compensates for any turning of the vessel in a horizontal direction which would otherwise preclude proper readings being taken.

In Figs. 13 and 14 I have illustrated a modified form of device for mechanically and positively maintaining a pointer arm in the same direction relative to a chart that the movable body occupies with reference to a transmitting station. The receiver 82 may be the same as that illustrated in Fig. 1 and is connected by a circuit 83 including a battery 84 to a quick acting sensitive relay 85 which in turn controls a circuit including conductors 90 and 91 and a battery 93 in a manner also similar to the arrangement illustrated in Fig. 1.

Bevel gear 46 is mounted within a casing the same or similar to the casing 32 and is driven by the shaft 31 (not illustrated). The bevel gear 46 engages a bevel gear 49 mounted on a shaft 143 having a bearing in a sleeve 144 in an arm 38a which is movable in a manner similar to the arm 38 illustrated in Fig. 1 on which the casing 32 is mounted. A disc 145 formed of insulating material is secured to the shaft 143 and is provided with a slip ring 146 which is engaged by a contact member 147 which is pressed downwardly by a spring 148 as best shown in Fig. 13. The conductor 91 is connected to the contact member 147. The shaft is surrounded by a gear 149 formed of fiber or other insulating material which is provided with a hub 150 surrounding a bearing sleeve 151 the lower end of which is provided with an opening 152 in which is received the pointer arm 70. The rotatable disc 145 is secured to the shaft 143 as by a pin 153 and the hub 150 of the gear 149 may be secured to the sleeve 151 by a screw 154 which engages a groove 155 formed in the shaft 143 and which prevents relative longitudinal movement between the shaft and the sleeve 151 and hub 150. Two continuous slip rings 156 and 157 are embedded in the upper surface of the disc 149 and an inner ring 158 is interrupted by insulating members 159 arranged at 90° from each other, two diametrically opposite segments 158a of the ring being electrically connected to the outer slip ring 156 while the other two diametrically opposite segments 158b are electrically connected to the inner slip ring 157. A contact member 160 engages the ring 158 and is provided with a stem 161 received in a sleeve 162 which is mounted in an opening in the disc and which is electrically connected to the slip ring 146. The collector rings 156 and 157 are engaged by contacts 163 and 164 mounted on the arm 38a. A pinion 165, adapted to mesh with the teeth of gear 149, is mounted on a sleeve 168 and preferably integral therewith. The sleeve 168 is provided at its lower end with a ratchet wheel 169 which is adapted to coact with and be moved by pawls 184 and 184a which will hereinafter be more fully described. Sleeve 168 is supported on shaft 166 which extends through an opening 167 of arm 38a the head 170 thereof bearing against the upper surface of arm 38a, the sleeve 168 being retained in position on the shaft 166 by a removable head 171 adapted to be secured on the lower end of the shaft 166 as by a pin 172. One of the conductors 91 of the circuit in which is the battery 93 is connected to the contact member 147 engaging the collector ring 146 and the other conductor 90 is connected through coils 173 and 174 to the contact members 163 and 164 respectively. The coils 173 and 174 are mounted in a U-shaped permanent magnet 175 provided with pole pieces 176 and 177. The coils 173 and 174 surround an armature 178 secured to a shaft 179 having its upper bearing at 180 in a bracket 181 secured to the bracket arm 38a as best shown in Fig. 13 and having its lower bearing at 182 in a bearing on the permanent magnet 175. A T-shaped member 183 is secured to the shaft 179 and is provided at the ends of the cross arm of the T with pawls 184 and 184a, the ends of which are directed toward each other and engage the ratchet wheel 169. If, at the time when the minimum signal is received in the antenna loop 10, and the circuit including the conductors 90 and 91 is closed, the indicator arm 70 points in the proper direction, the contact member 160 will be located over an insulating member 159 and the circuit including the conductors 90 and 91 will be open.

If, on the other hand, the indicating arm 70 does not correspond in position to the direction of the movable body from the transmitting station, then when the minimum signal is received in the antenna loop 10 and the movable contact member 87 is brought into engagement with the fixed contact member 88, the contact member 160 will engage either the segmental contact 158a or 158b, depending upon the direction that the indicator arm is dislocated from its correct position. Assuming that the contact 160 engages the segmental contact 158a then a circuit is closed from the battery 93 through the contact members 87, 88, coil 173, contact 163, segmental contact 158a, contact 160 and slip ring 146, contact member 147 to the other side of the battery 93. The armature 178 will be attracted towards the pole piece 177 and the pawl 184a will move the ratchet wheel 169 through an angle represented by one tooth. It will be understood that the pawls 184a and 184 are so arranged that when one of the pawls actuates the ratchet wheel, the other pawl is freed therefrom. The pawls then assume their normal position and if on the next half rotation of the antenna loop 10, the contact member 160 still engages the segmental contact 158a, the coil 173 will again be energized and the ratchet moved through another tooth. This cycle will be repeated until the contact member 160 is again brought into engagement with the insulating member 159 at the instant that the minimum signal is received in the antenna loop.

If, on the other hand, the contact member 160 is located over the segment 158b when a minimum signal is received in the antenna loop, then the coil 174 is energized and the ratchet wheel 169 will be rotated in the opposite direction to return the indicator hand 70 towards its correct position.

In Fig. 15 I have illustrated a sensitive relay which is better adapted to respond to the rather feeble currents from the receiver than that illustrated in Fig. 5. In the embodiment here illustrated the output side of the receiver 82 is connected to the primary 821 of a transformer the secondary 822 of which is connected to the coil (not illustrated) of a galvanometer 185 through a permanently adjusted crystal 823 or other suitable type of valve. This arrangement gives the galvanometer pulsating direct current and holds the mirror to one side only and is also free from current when no signal is received. The galvanometer is provided with the usual oscillatable member 186 actuated by the coil (not illustrated) and on which is mounted a mirror 187. A source of light, illustrated as an incandescent lamp 188, included in a circuit comprising a battery 189, projects a beam of light through a slit 190 in a shield 191 and through a lens 192 against the mirror 187 from which it is reflected. A light shield 193 is so arranged with reference to the associated parts that the beam of light from the lamp 188 is directed against the shield 193 except when the minimum signal is received in the antenna loop 10 at which time the beam of light from the lamp is reflected past the edge of the shield 193 against the selenium cell 120. The circuit including the selenium cell 120 and which corresponds to the circuit including the conductors 90 and 91 in Figs. 1 and 14 is thereby closed.

Figure 16:
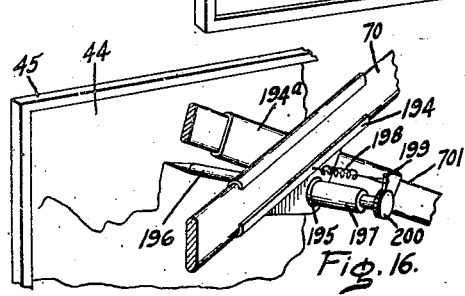
Fig. 16 is a fragmentary perspective view illustrating a device for recording on a chart the course pursued by a movable body.

In Fig. 16, I have illustrated a device in which my invention is used for recording on a chart the course pursued by a movable body. A chart 44 is mounted on a suitable frame and arms 70 and 701 move over the chart as in Fig. 1. Slidable sleeves 194 and 194a are fitted over the arms and the arms are slidable therethrough. The two sleeves 194 and 194a are pivoted together, preferably by a sleeve 195 through which extends a recording stylus 196 connecting with a suitable receptacle 197, the stylus being lightly forced against the chart by a tension spring 198 attached to the sleeve 194 and to a stem 199 secured to the head 200 on the stylus 196. When the two members 32 and 321 are located over points on the chart which indicate the positions of the stations from which signals are transmitted then the intersecting point of the two arms 720 and 721 always indicate on the chart the position of the movable body. By providing a slidable member and a recording device attached thereto, such device will follow on the chart the course pursued by the movable body and the recording means will produce on the chart a line indicating the course pursued by the vessel or other movable body.

While I have illustrated intersecting arms for indicating on a chart the position of a movable body, it will be understood that intersecting lines of light produced in the manner illustrated in my application Ser. No. 646,728 which was filed in the Patent Office on or about December 10, 1932 may be used in place of the arms.

In either case, visible linear intersecting indicators are produced over said chart which are maintained in positions with respect to said chart corresponding to the directions of said body from the respective transmitting stations.

It will also be understood that two direction finders of the character illustrated in my application Ser. No. 646,730 which was filed in the Patent Office on or about December 10, 1932 may be used for controlling the intersecting line which moves over the chart instead of the single rotatable direction finder illustrated herein.

Under some conditions as where a coast line is known or is visible a single linear indicator may be sufficient for coast navigation and the linear indicator crosses the line indicating the coast.

While I have illustrated photo electric cells and associated means for maintaining the gear wheel 104 oriented in a predetermined direction, it will be understood that any known means may be utilized for this purpose.

While I have described my invention in its preferred embodiment, it is to be understood that the words which I have used are words of description and not of limitation and that changes within the purview of the appended claims may be made without departing from the true scope and spirit of my invention in its broader aspects.

What I claim is:

1. In a navigating apparatus for a movable body, a rotatable antenna loop tuned to receive electromagnetic waves transmitted from a plurality of spaced stations, a chart mounted upon said body, a plurality of intersecting linear indicators movable over said chart, a plurality of rotatable members, means for rotating said loop and said members substantially in synchronism, means responsive to a turning movement of said body for producing the same relative angular movement between said loop and said rotatable members, and means comprising said loop and said members for maintaining said indicators in directions with respect to said chart corresponding to the directions of said body from the respective stations.

2. In a navigating apparatus for a movable body, a rotatable antenna loop tuned to receive electromagnetic waves transmitted from a plurality of spaced stations, a chart mounted upon and fixed with respect to said body, a plurality of intersecting linear indicators movable over said chart, a plurality of rotatable members, means for rotating said loop and said members substantially in synchronism, means responsive to a turning movement of said body for producing the same relative angular movement between said loop and said rotatable members, and means comprising said loop and said members for maintaining said indicator in directions with respect to said chart corresponding to the directions of said body from the respective stations.

3. In a navigating apparatus for a movable body, a chart mounted on said body and fixed with respect thereto, means for receiving electromagnetic waves transmitted from known stations, means controlled by said receiving means and movable relative to said chart whereby said means may be positioned over points on said chart representing the geographical location of said stations, said last mentioned means comprising means for indicating on said chart the position of said movable body, and means operable in response to a turning movement of said body for correcting the effect of such movement on the indicating means.

4. In a navigating apparatus for a movable body, a chart mounted on said body and fixed with respect thereto, means for receiving electromagnetic waves transmitted from known stations, means controlled by said receiving means comprising pivotally mounted, linear indicators, said last mentioned means being movable relative to said chart whereby said indicators may be positioned to pivot over points on said chart representing the geographical location of said stations, and means operable in response to a turning movement of said body for correcting the effect of such movement on said indicators.

5. In a navigating apparatus for a movable body, a chart mounted on said body and fixed with respect thereto, means for receiving electromagnetic waves transmitted from distant stations, means for indicating on said chart the position of said movable body, electrical means controlled by said receiving means for actuating said indicating means, and means operable in response to a turning movement of said body for correcting the effect of such movement on said indicating means.

6. In a navigating apparatus for a movable body, a chart mounted on said body and fixed with respect thereto, means for receiving electromagnetic waves transmitted from known stations, means comprising pivotally mounted, linear indicators, said last mentioned means being movable relative to said chart whereby said indicators may be positioned to pivot over points on said chart representing the geographical location of said stations, electrical means controlled by said receiving means for controlling said indicating means, and means operable in response to a turning movement of said body for correcting the effect of such movement on said indicating means.

7. In a device of the character described for use on a movable body, a chart mounted on said body and fixed with respect thereto, means for receiving electromagnetic waves transmitted from distant stations, means comprising a pivotally mounted, linear indicator adapted to extend over said chart and movable relative thereto whereby said indicator may be positioned to pivot over points on said chart representing the geographical location of said stations, means controlled by said receiving means for actuating said indicator and means operable in response to a turning movement of said body for correcting the effect of such movement on the position of said indicator over said chart.

8. In a device of the character described for use on a movable body, receiving means comprising a rotatable loop antenna and means electrically connected with said loop for tuning to desired electromagnetic waves, means comprising a pivotally mounted, linear indicator and electrical means controlled by said receiving means for actuating said linear indicator, and means for normally rotating said antenna and last-mentioned means substantially in synchronism but operable to effect an asynchronous rotation thereof.

9. In a device of the character described for use on a movable body, receiving means comprising a rotatable loop antenna and means electrically connected with said loop for tuning to desired electromagnetic waves, means comprising a pivotally mounted, linear indicator and electrical means controlled by said receiving means for actuating said linear indicator, means for rotating said antenna and last mentioned means substantially in synchronism, and means operable in response to a turning movement of said body for effecting an asynchronous rotation of said antenna and indicator control means whereby the effect of such movement on said indicator is compensated for.

10. In a device of the character described for use on a movable body, means for receiving electromagnetic waves transmitted from distant stations comprising a loop antenna, a pivotally mounted, linear indicator, means for controlling said indicator, means including an epicyclic gear train for rotating said antenna and last-mentioned means substantially in synchronism, and means operable in response to a turning movement of said body for effecting an asynchronous rotation of said loop and indicator control means whereby the effect of said turning movement on said indicator is remedied.

11. In a device of the character described for use on a movable body, receiving means comprising a rotatable loop antenna and means electrically connected with said loop for tuning to desired electromagnetic waves, means comprising a pivotally mounted, linear indicator and rotatably mounted, electromagnetic means controlled by said receiving means for actuating said indicator, means for rotating said loop and last-mentioned means substantially in synchronism and means operable in response to a turning movement of said body for effecting an asynchronous rotation of said antenna and electromagnetic means whereby the effect of such movement on said indicator is compensated for.

12. In a navigating apparatus for a movable body, a chart mounted on said body and fixed with respect thereto, means for receiving electromagnetic waves transmitted from distant stations, means for indicating on said chart the position of said movable body, electrical means controlled by said receiving means for positioning said indicating means, and means operable in response to a turning movement of said body for further controlling said electrical means for positioning the indicating means whereby the effect of such turning movement of said body on said electrical positioning means is compensated for.

HJALMAR E. SJÖSTRAND.